(12) United States Patent
Moreton

(10) Patent No.: US 7,916,155 B1
(45) Date of Patent: Mar. 29, 2011

(54) COMPLEMENTARY ANTI-ALIASING SAMPLE PATTERNS

(75) Inventor: Henry Packard Moreton, Woodside, CA (US)

(73) Assignee: NVIDIA Corporation, Santa Clara, CA (US)

(*) Notice: Subject to any disclaimer, the term of this patent is extended or adjusted under 35 U.S.C. 154(b) by 761 days.

(21) Appl. No.: 11/934,729

(22) Filed: Nov. 2, 2007

(51) Int. Cl.
*G06T 15/40* (2006.01)
*G06T 11/40* (2006.01)
*G09G 5/00* (2006.01)
*G06K 9/40* (2006.01)
*G06K 9/32* (2006.01)

(52) U.S. Cl. ........ 345/613; 345/421; 345/611; 345/630; 345/552; 382/254; 382/266; 382/269; 382/300

(58) Field of Classification Search .............. 345/418, 345/421, 426–428, 581, 588, 614, 611–613, 345/630, 552; 382/254, 266, 269, 274, 276, 382/300

See application file for complete search history.

(56) References Cited

U.S. PATENT DOCUMENTS

| | | | |
|---|---|---|---|
| 6,967,663 B1* | 11/2005 | Bastos et al. | 345/613 |
| 7,050,068 B1* | 5/2006 | Bastos et al. | 345/613 |
| 7,145,577 B2* | 12/2006 | Hunter | 345/613 |
| 7,403,208 B1* | 7/2008 | Bastos et al. | 345/613 |
| 7,511,717 B1* | 3/2009 | Bastos et al. | 345/613 |
| 2003/0043169 A1* | 3/2003 | Hunter | 345/611 |

* cited by examiner

*Primary Examiner* — Wesner Sajous
(74) *Attorney, Agent, or Firm* — Patterson & Sheridan, LLP

(57) ABSTRACT

Systems and methods for producing anti-aliased images use a sub-pixel sample pattern set that includes two or more unique sub-pixel sample patterns that are complementary. The sub-pixel sample patterns are offset from each pixel center and used to produce images that are combined to produce the anti-aliased image. In addition to providing sub-pixel coverage information, the sub-pixel sample pattern sets may be used to produce sub-pixel shading information. Furthermore, the sub-pixel sample pattern sets may be used in single processor systems or in multiprocessor systems to produce anti-aliased images.

19 Claims, 9 Drawing Sheets

US 7,916,155 B1

COMPLEMENTARY ANTI-ALIASING SAMPLE PATTERNS

BACKGROUND OF THE INVENTION

1. Field of the Invention

Embodiments of the present invention generally relate to anti-aliasing and, more specifically, to using sub-pixel sample pattern sets to produce anti-aliased images.

2. Description of the Related Art

Conventional anti-aliasing patterns are carefully designed to sample all of the geometry in a scene and in order to produce a high quality anti-aliased image. Conventional anti-aliasing techniques use a sample pattern to determine sub-pixel coverage. When a sub-pixel sample pattern with aligned sub-pixel sample positions is applied to all of the pixels in a scene, the sample pattern may be visible in the anti-aliased image. Additionally, when a sample pattern is used for coverage, but not for shading, details of scenes produced using a high frequency shading function may not be visible. For example, shiny (highly reflective) objects with varying geometry may not be sampled at a high enough rate to produce a high quality image when the sample pattern is not used for shading operations.

Accordingly, there is a need for improved anti-aliasing sample patterns that produce sub-pixel samples for both coverage and shading. Furthermore, it is desirable to be able to produce anti-aliased images using multi-processor systems.

SUMMARY OF THE INVENTION

The current invention involves new systems and methods for producing anti-aliased images using sub-pixel sample pattern sets. Two or more unique sub-pixel sample patterns that are complementary are specified by a sub-pixel sample pattern set. In addition to providing sub-pixel coverage information, the sub-pixel sample pattern sets may be used to produce sub-pixel shading information. Furthermore, the sub-pixel sample pattern sets may be used in multiprocessor systems to produce anti-aliased images with each processor rending a scene using a different viewport offset and one of the sub-pixel sample patterns in the sub-pixel pattern set.

Various embodiments of a method of the invention for producing anti-aliased image data includes loading a first sub-pixel sample pattern for use during rendering and rendering scene data using first pixel offset and the first sub-pixel sample pattern to produce first image data. Second image data is produced by loading a second sub-pixel sample pattern that is complementary to the first sub-pixel sample pattern and rendering the scene data using a second pixel offset and the second sub-pixel sample pattern. The first image data and the second image data are combined to produce an anti-aliased image of the scene data.

Various embodiments of the invention include a system for producing an anti-aliased image. The system includes a geometry processing unit, a sample position table, rasterization, and a fragment shader. The geometry processing unit is configured to store pixel offsets for use during viewport transform operations to produce offset vertices defining graphics primitives of scene data. The sample position table is configured to store sub-pixel sample patterns for complementary sample pattern sets. The rasterization unit is coupled to the sample position table and configured to produce sub-pixel coverage information for the graphics primitives using a first sub-pixel sample pattern of a complementary sample pattern set. The fragment shader is coupled to the rasterization unit and configured to (i) shade fragments of graphics primitives using the first sub-pixel sample pattern of the complementary sample pattern set to produce first image data corresponding to a first pixel offset and the first sub-pixel sample pattern of the complementary sample pattern set and (ii) combine the first image data and second image data corresponding to a second pixel offset and the other sub-pixel sample pattern of the complementary sample pattern set to produce the anti-aliased image of the scene data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1A:
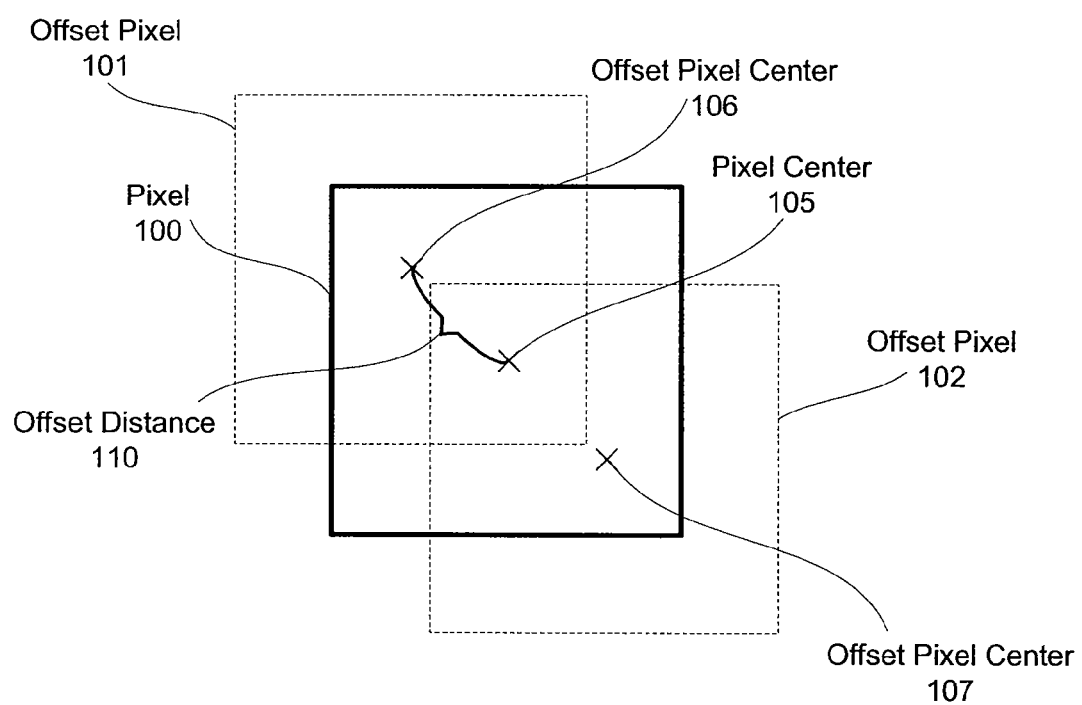
FIG. 1A illustrates a pixel and an offset pixel set for anti-aliasing in accordance with one or more aspects of the present invention.
Figure 1B:
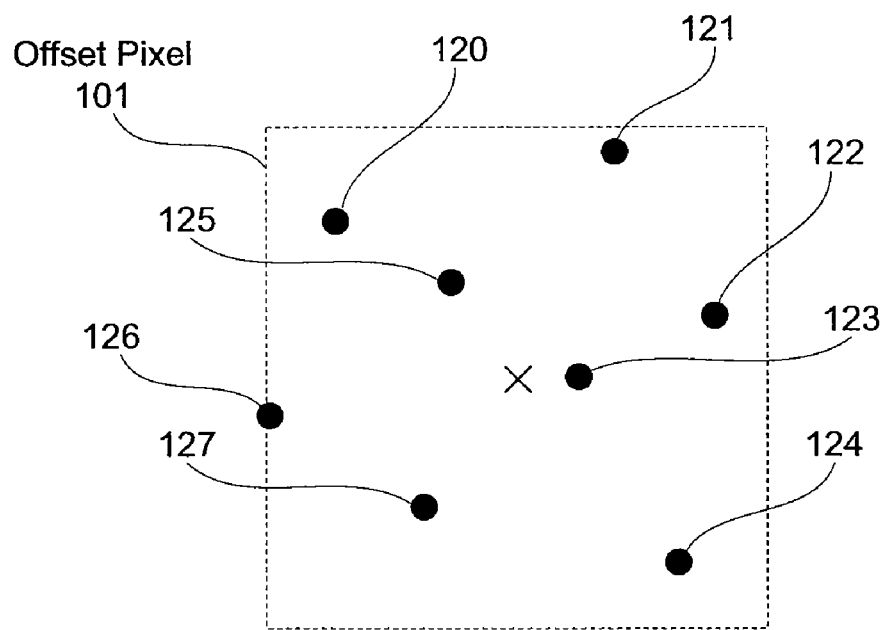
FIGS. 1B and 1C illustrate the individual sub-pixel sample patterns shown in FIG. 1A in accordance with one or more aspects of the present invention.
Figure 1C:
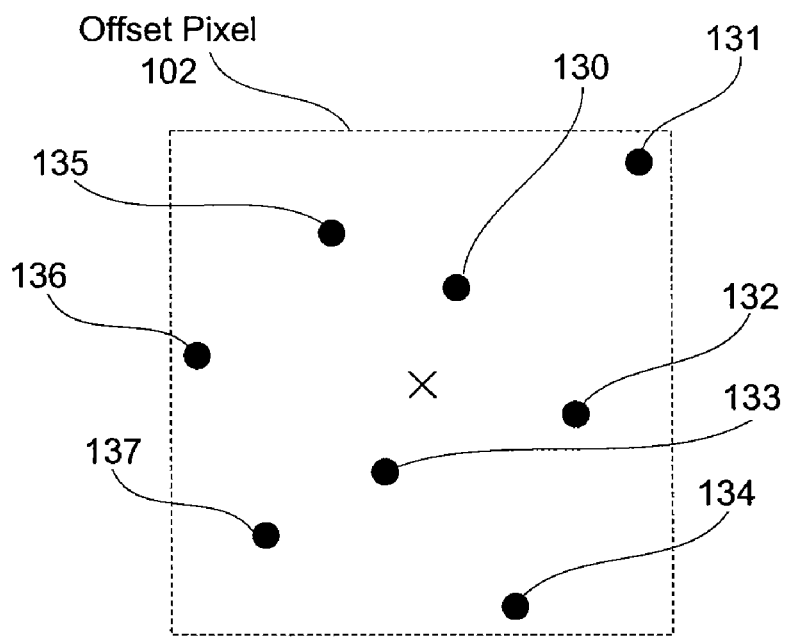

FIG. 1A illustrates a pixel 100 and an offset pixel set of offset pixel 101 and offset pixel 102, in accordance with one or more aspects of the present invention. Each offset pixel 101 and 102 includes one or more sub-pixel sample positions for pixel 100 that are used to produce an anti-aliased image including pixel 100, as shown in FIGS. 1B and 1C. The total number of sub-pixel sample positions is the sum of the sub-pixel sample positions in offset pixel 101 and offset pixel 102. Offset pixel center 106 is separated from pixel center 105 by an offset distance 110. Offset pixel center 107 is also separated from pixel center 105 by an offset distance.

Figure 1D:
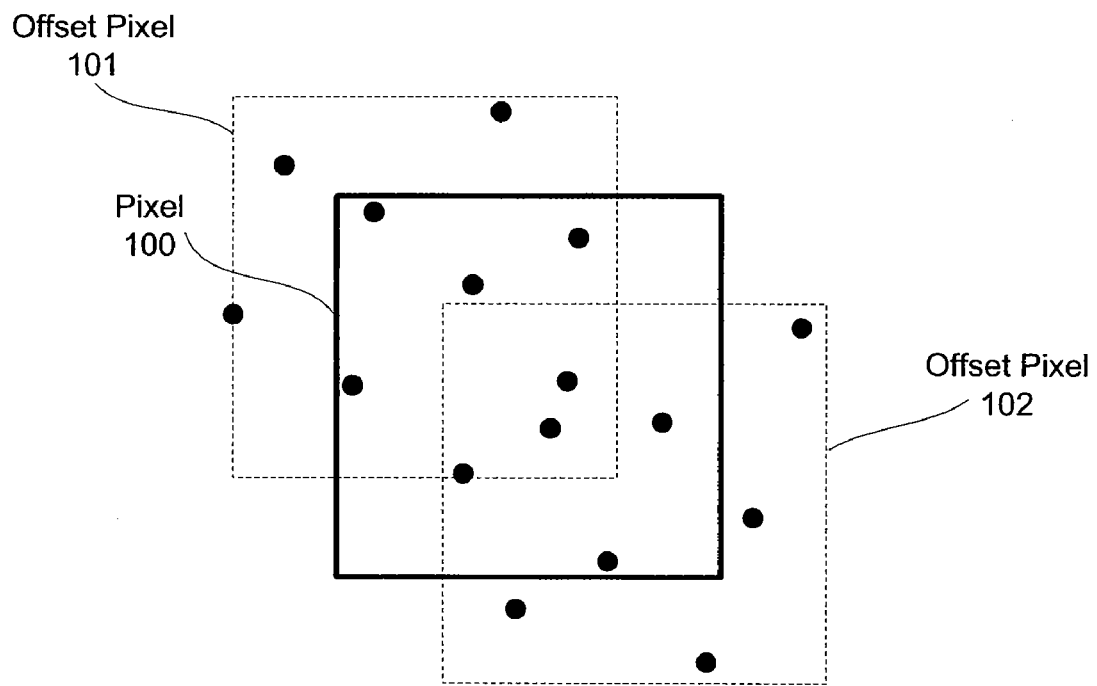
FIG. 1D illustrates the pixel and offset pixel set sub-pixel sample patterns in accordance with one or more aspects of the present invention.

FIGS. 1B and 1C illustrate the individual sub-pixel sample patterns for offset pixels 101 and 102 of FIG. 1A, respectively, in accordance with one or more aspects of the present invention. Although offset pixels 101 and 102 each include 8 sub-pixel sample positions, in other embodiments of the present invention, the number of sub-pixel sample positions may be greater or smaller. Similarly, the location of each sub-pixel sample position within offset pixel 101 and 102 may vary. Importantly, the sub-pixel sample patterns for each offset pixel set are complementary, meaning that when combined, the samples forming the superimposed sub-pixel offset pattern are well distributed for the pixel being sampled. Some of the sub-pixel sample positions for offset pixel 101 and 102 may lie outside of the boundaries of pixel 100, as shown in FIG. 1D. Furthermore, taken individually, each sample pattern within a set provides a good sub-pixel distribution, so that when only a single pattern of the set is used to produce an anti-aliased image, the image quality is improved compared with an image produced using a single sub-pixel sample position.

Offset pixel 101 includes a pattern of 8 sub-pixel positions, 120, 121, 122, 123, 124, 125, 126, and 127. Offset pixel 102 includes a complementary pattern of 8 additional sub-pixel positions, 130, 131, 132, 133, 134, 135, 136, and 137. FIG. 1D illustrates the pixel and offset pixel set sub-pixel sample patterns, in accordance with one or more aspects of the present invention. Note that some of the sub-pixel sample positions for offset pixel 101 and 102 lie outside of the boundaries of pixel 100. This is advantageous for rendering higher quality images.

In order to produce an anti-aliased image, a scene is rendered using a first offset corresponding to offset pixel center 106 and sub-pixel sample positions 120, 121, 122, 123, 124, 125, 126, and 127 to produce a first rendered image. The scene is also rendered (serially or in parallel) using a second offset corresponding to offset pixel center 107 and complementary sub-pixel sample positions 130, 131, 132, 133, 134, 135, 136, and 137 to produce a second rendered image. The first rendered image and the second rendered image are then combined to produce the anti-aliased image of the scene.

When sub-pixel sample positions are used, depth (or z) testing is performed per sub-pixel sample. A single shaded color may be computed for each fragment (portion of a graphics primitive within a pixel) and used for each one of the sub-pixel sample positions. Following depth testing, all of the sub-pixel samples within a pixel are resolved to produce a single color for the pixel that is stored in the frame buffer. That single color is then combined with another single color for the same pixel for the second render image to produce the final pixel color of the anti-aliased image. In other embodiments of the present invention, the sub-pixel sample colors are stored in the frame buffer for the first rendered image and the sub-pixel sample colors are combined with the sub-pixel sample colors of the second rendered image to produce the final pixel color for each pixel of the anti-aliased image.

Figure 2:
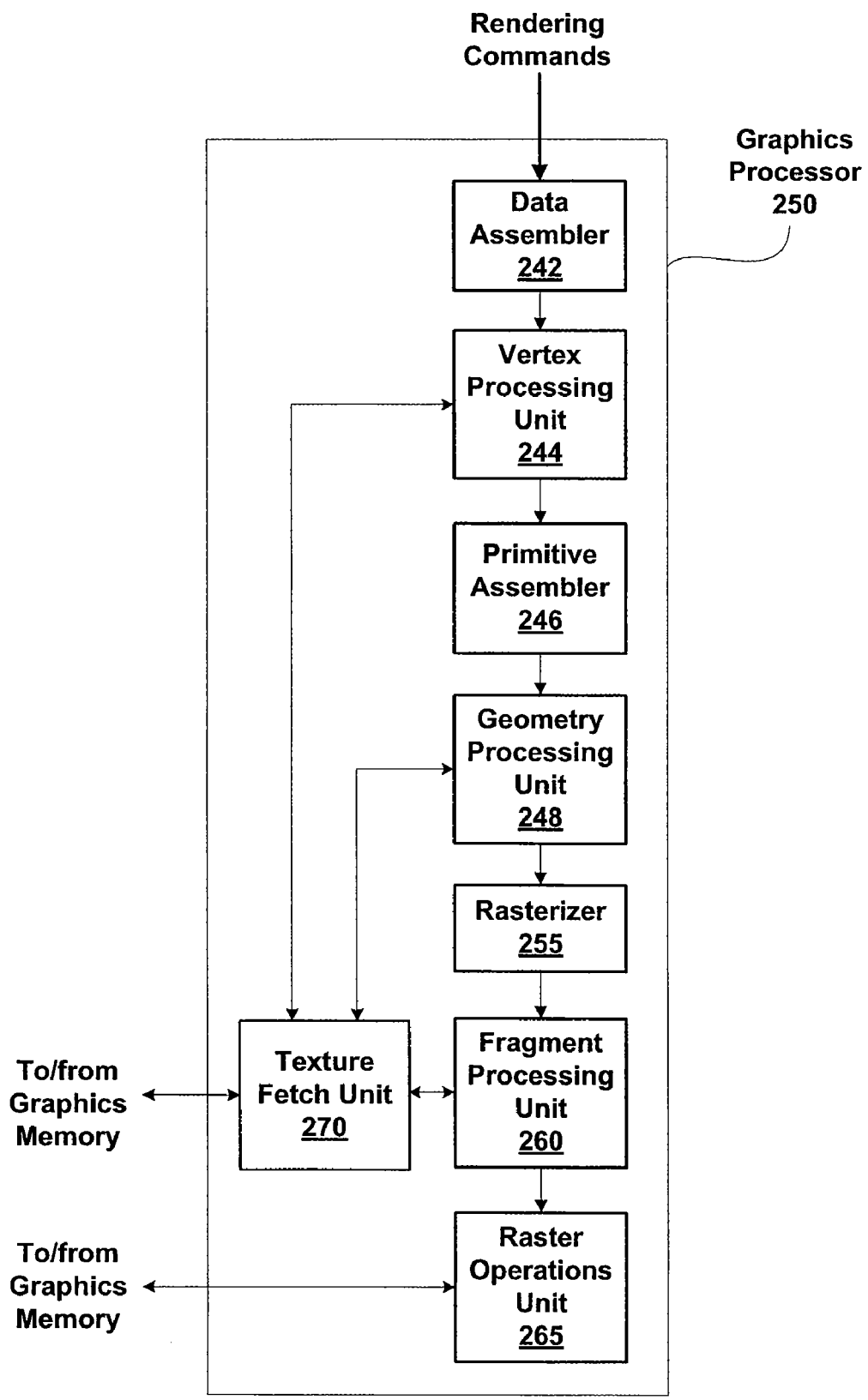
FIG. 2 is a block diagram of a graphics processor in accordance with one or more aspects of the present invention.

FIG. 2 illustrates a graphics processor, in accordance with one or more aspects of the present invention. Graphics processor 250 includes a data assembler 242, vertex processing unit 244, a primitive assembler 246, geometry processing unit 248, a rasterizer 255, fragment processing unit 260, and a raster operations unit 465. Data assembler 242 is a fixed function unit that collects vertex data for high-order surfaces, primitives, and the like, and outputs the vertex data to vertex processing unit 244. Vertex processing unit 244 is a programmable execution unit that is configured to execute vertex shader programs, transforming vertex data as specified by the vertex shader programs. For example, vertex processing unit 244 may be programmed to transform the vertex data from an object-based coordinate representation (object space) to an alternatively based coordinate system such as world space or normalized device coordinates (NDC) space. Vertex processing unit 244 may read data that is stored in graphics memory through texture fetch unit 270 for use in processing the vertex data.

Primitive assembler 246 receives processed vertex data from vertex processing unit 244 and constructs graphics primitives, e.g., points, lines, triangles, or the like, for processing by geometry processing unit 248. Geometry processing unit 248 is a programmable execution unit that is configured to execute geometry shader programs, transforming graphics primitives received from primitive assembler 246 as specified by the geometry shader programs. For example, geometry processing unit 248 may be programmed to subdivide the graphics primitives into one or more new graphics primitives. Specifically, geometry processing unit 248 may perform clipping, projection, and viewport transform operations using offset distance 105. A setup unit within geometry processing unit 248 may be programmed with offset distance 105 in order to calculate parameters used to determine sub-pixel coverage and shading data, as described in conjunction with FIG. 3B. Geometry processing unit 248 outputs the parameters and new graphics primitives to rasterizer 255. Geometry processing unit 248 may read data that is stored in graphics memory through texture fetch unit 270 for use in processing the geometry data.

Rasterizer 255 scan converts the new graphics primitives and outputs fragments and sub-pixel coverage data for one of the sub-pixel sample patterns in the set of offset pixels to fragment processing unit 260. Fragment processing unit 260 is a programmable execution unit that is configured to execute fragment shader programs, transforming fragments received from rasterizer 255 as specified by the fragment shader programs. For example, fragment processing unit 260 may be programmed to perform operations such as perspective correction, texture mapping, shading, blending, and the like, to produce shaded fragments that are output to raster operations unit 465. Fragment processing unit 260 may be configured to produce sub-pixel shading information, e.g., color data or texture map coordinates, for each sub-pixel sample position in a sub-pixel sample pattern set. Computing a color and/or texture map coordinates for each sub-pixel sample position in the sample pattern set samples shiny (highly reflective) objects with varying geometry at a high enough rate to produce a high quality anti-aliased image.

Texture fetch unit 270 produces read requests and performs texture filtering operations, e.g., bilinear, trilinear, anisotropic, and the like. Raster operations unit 265 is a fixed function unit that receives processed fragment data and optionally performs near and far plane clipping and raster operations, such as stencil, z test, and the like, and outputs pixel data as processed graphics data for storage in graphics memory. The processed graphics data may be stored in a frame buffer in graphics memory for display or further processing. Specifically, the processed graphics data produced for one of the sub-pixel samplepatterns, e.g., sub-pixel color and depth, may be combined with graphics data produced for one or more of the complementary sub-pixel samplepatterns in the set to produce an anti-aliased image.

Figure 3A:
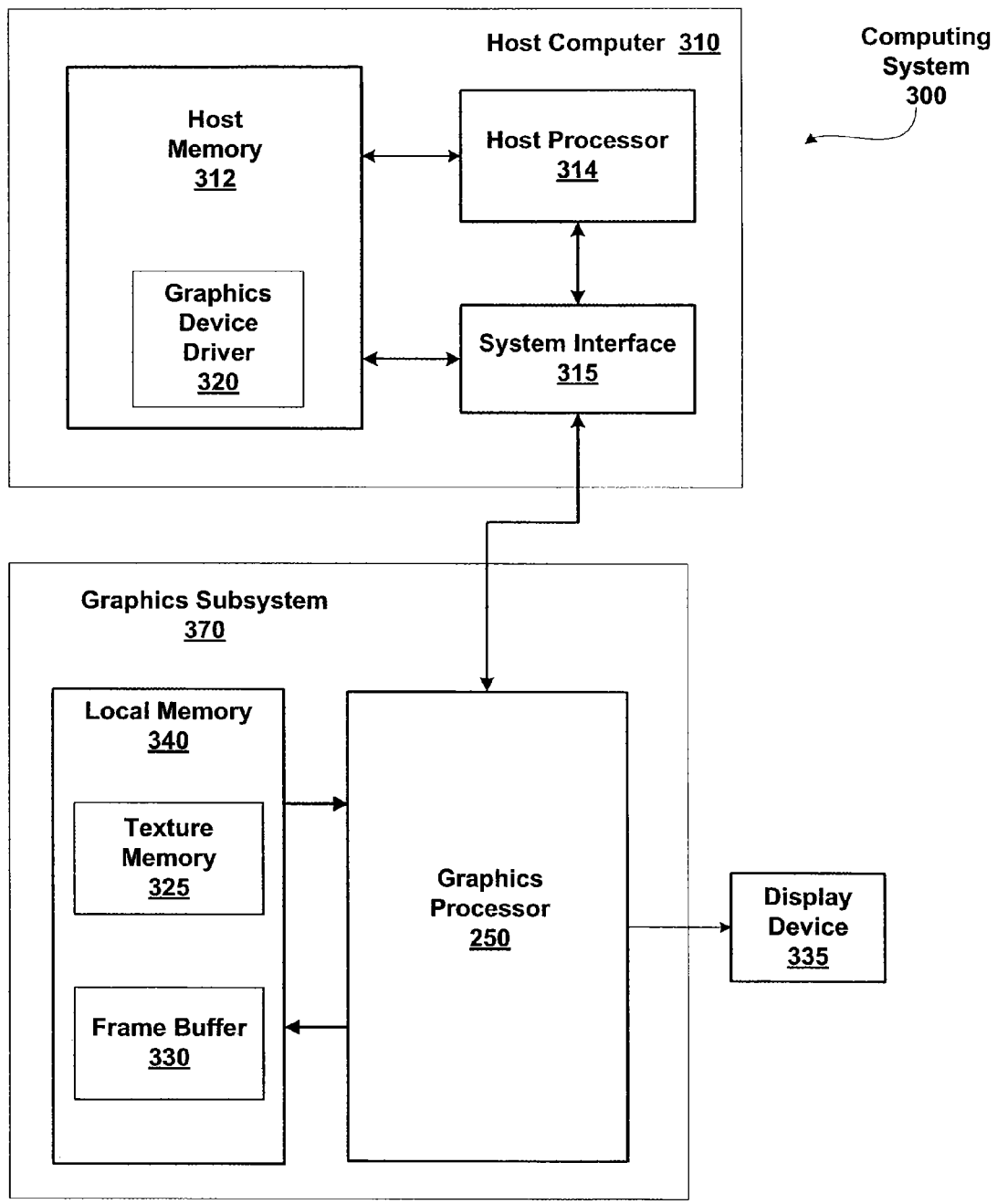
FIG. 3A illustrates the graphics processor of FIG. 2 in accordance with one or more aspects of the present invention.

FIG. 3A illustrates one embodiment of a computing system 300 including a host computer 310 and a graphics subsystem 370, in accordance with one embodiment of the present invention. Graphics subsystem 370 includes graphics processor 250 of FIG. 2. Computing system 300 may be a desktop computer, server, laptop computer, palm-sized computer, tablet computer, game console, cellular telephone, computer based simulator, or the like. Host computer 310 includes host processor 314 that may include a system memory controller to interface directly to host memory 312 or may communicate with host memory 312 through a system interface 315. System interface 315 may be an I/O (input/output) interface or a bridge device including the system memory controller to interface directly to host memory 312.

A graphics device driver 320 is stored in host memory 312 and is configured to interface between applications and a graphics subsystem 370. Graphics device driver 320 translates instructions for execution by graphics processor 250 based on the specific capabilities of graphics processor 250. In some embodiments of the present invention, graphics device driver 320 is configured to provide offset information and sub-pixel sample patterns positions to graphics processor 250.

Host computer 310 communicates with graphics subsystem 370 via system interface 315. Data received by graphics processor 250 can be processed by a graphics pipeline within graphics processor 250 or written to a graphics memory. Graphics processor 250 uses graphics memory to store graphics data and program instructions, where graphics data is any data that is input to or output from units within graphics processor 250. Graphics memory can include portions of host memory 312, graphics memory, register files coupled to the components within graphics processor 250, and the like. Graphics processor 250 includes one or more processing units that may each read and/or write graphics memory, as described in conjunction with FIG. 2. In alternate embodiments, host processor 314, graphics processor 250, system interface 315, or any combination thereof, may be integrated into a single processing unit. Further, the functionality of graphics processor 250 may be included in a chip set or in some other type of special purpose processing unit or co-processor.

When the data received by graphics subsystem 370 has been completely processed by graphics processor 250, processed graphics data is output to a frame buffer 330 within graphics memory. Alternatively, processed graphics data is output to a texture memory 325 within graphics memory and the processed graphics data is further processed by graphics processor 250 to produce an anti-aliased image. In some embodiments of the present invention, graphics processor 250 is optionally configured to deliver data to a display device 335, network, electronic control system, other computing system 300, other graphics subsystem 370, or the like. Alternatively, data is output to a film recording device or written to a peripheral device, e.g., disk drive, tape, compact disk, or the like.

Figure 3B:
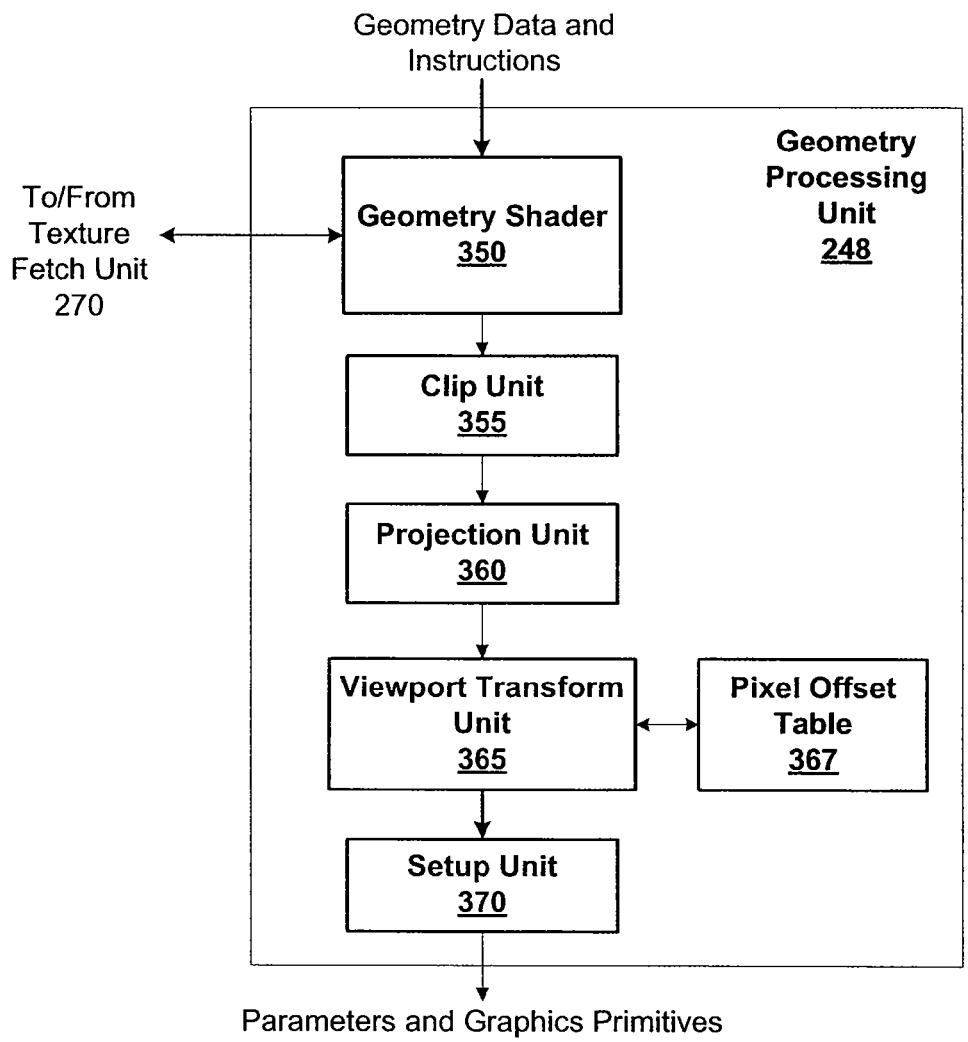
FIG. 3B illustrates the geometry processing unit of the graphics processor of FIG. 3A in accordance with one or more aspects of the present invention.

FIG. 3B illustrates geometry processing unit 248 of FIG. 2, in accordance with one or more aspects of the present invention. Geometry processing unit 248 includes a vertex shader 350, clip unit 355, projection unit 360, a viewport transform unit 365, a pixel offset table 367, and a setup unit 372. Geometry shader 350 receives the geometry program instructions and graphics primitives and operates on the vertices defining graphics primitives to produce additional graphics primitives or to remove graphics primitives. Geometry shader 350 outputs processed vertices that define graphics primitives and configuration information to clip unit 355. The graphics primitives output by geometry shader 350 are represented in object space.

Clip unit 355 clips graphics primitives defined by vertices in to produce clipped graphics primitives. In some embodiments of the present invention, clip unit 355 converts vertices represented in object space into vertices represented in homogeneous space. Some graphics primitives may not require clipping and are output by clip unit 355 unmodified, while other graphics primitives are clipped and new vertices are produced.

Projection unit 360 receives (clipped and unclipped) graphics primitives from clip unit 355 and divides homogeneous coordinates by w to produce coordinates for each vertex that are represented in normalized device coordinate space.

Viewport transform unit 365 receives the vertices in normalized device coordinate space from projection unit 360 and may be configured to translate the vertices into device coordinate space (screen space). Specifically, viewport transform unit 365 may scale the normalized device coordinates for each vertex by a viewport scale and add a viewport offset that includes the offset distance for one of the offset pixels in an offset pixel set. Pixel offset table 367 stores offset information corresponding to one or more offset pixels. The offset information may be programmed by graphics device driver 320 based on the number of sub-pixel sample positions.

Setup unit 372 receives the coordinates for the vertices defining graphics primitives, represented in device coordinate space, and computes slopes for each graphics primitive edge defined by two vertices. In some embodiments of the present invention, the coordinates are in a floating point format and setup unit 372 reformats each coordinate to a specific sub-pixel precision, such as 8 bits of sub-pixel precision. Setup unit 372 determines edge equations (line equations) based on the computed slopes and outputs the line equations to rasterizer 265.

Figure 3C:
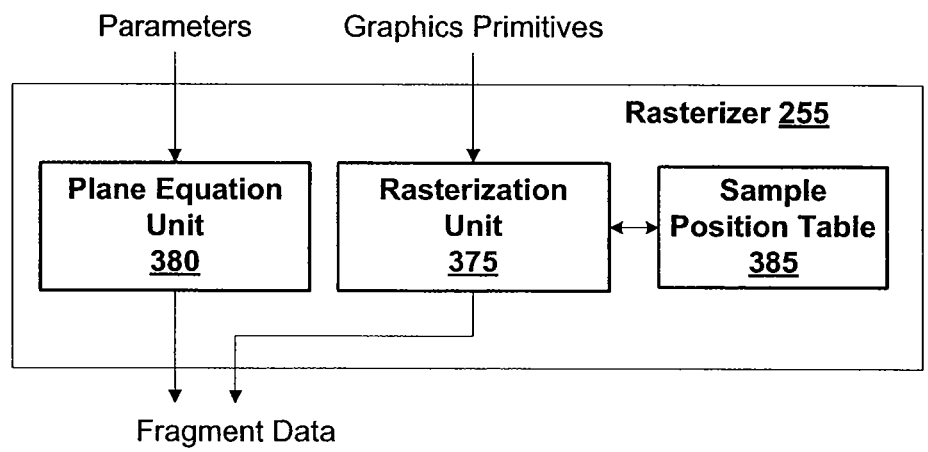
FIG. 3C illustrates the rasterizer of the graphics processor of FIG. 3A in accordance with one or more aspects of the present invention.

FIG. 3C illustrates rasterizer 255 of FIG. 2, in accordance with one or more aspects of the present invention. A plane equation unit 260 within rasterizer 255 receives the line equations produced by setup unit 370 and produces plane equation coefficients for use in shading operations as fragment data. A rasterization unit 375 rasterizes the graphics primitives provided by geometry processing unit 248 and produces per-pixel coverage information that is output as fragment data, using the sub-pixel sample positions to determine where to sample each graphics primitive during the rasterization process. A sample position table 385 stores sub-pixel position pattern information corresponding to one or more sets of patterns. The sub-pixel position pattern information may be programmed by graphics device driver 320 based on the number of sub-pixel sample positions and pixel offset.

Figure 4:
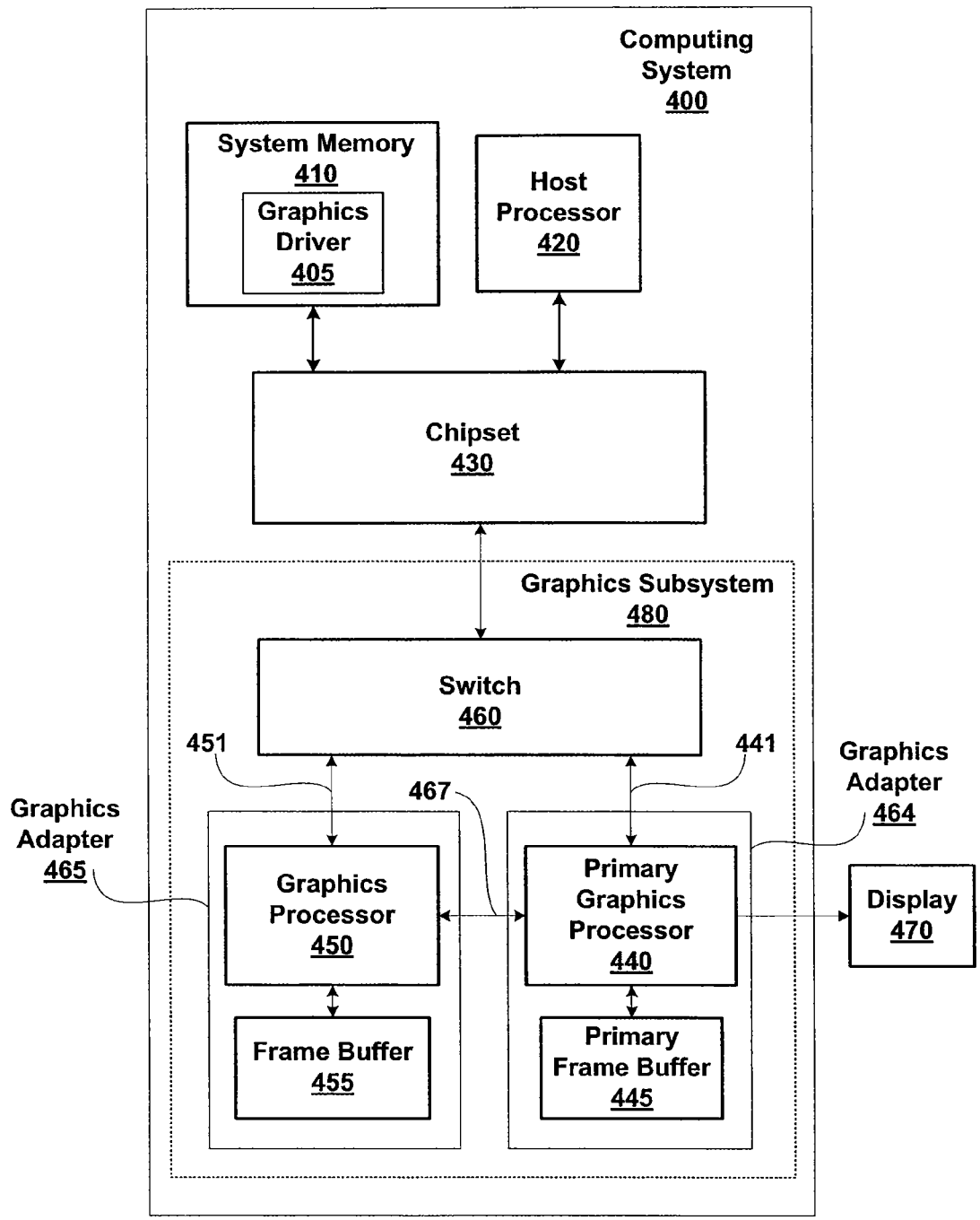
FIG. 4 is a block diagram of a multiprocessor graphics processing system in accordance with one or more aspects of the present invention.

FIG. 4 is a block diagram of a multiprocessor graphics processing system that includes graphics adapter 464 and graphics adapter 465, in accordance with one or more aspects of the present invention. Like computing system 300, computing system 400 may be a desktop computer, server, laptop computer, palm-sized computer, tablet computer, game console, cellular telephone, hand-held device, computer based simulator, or the like. Computing system 400 includes a host processor 420, a system memory 410, and a chipset 430 that is directly coupled to a graphics subsystem 480. Graphics subsystem 480 includes a switch 460, and multiple graphics devices, graphics adapter 464 and graphics adapter 465.

A single device driver, graphics driver 405, stored within system memory 410, configures the devices within graphics subsystem 480 and communicates between applications executed by host processor 420 and graphics adapters 465 and 464. In a conventional graphics processing system running the Windows® OS two device drivers are used, one for each graphics adapter installed in the system.

In some embodiments of computing system 400, chipset 430 may include a system memory switch and an input/output (I/O) switch that may include several interfaces such as, Advanced Technology Attachment (ATA) bus, Universal Serial Bus (USB), Peripheral component interface (PCI), or the like. Switch 460 provides an interface between chipset 430 and each of graphics adapter 465 and graphics adapter 464 when a first port and a second port of switch 460 are coupled to a connection 451 and a connection 441, respectively. In some embodiments of switch 460, switch 460 provides an indirect interface between graphics adapter 465 and graphics adapter 464 through the combination of connections 451 and 441. Connection 467 provides a direct connection between graphics adapter 465 and graphics adapter 464. In some embodiments of the present invention, connection 467 is omitted. Switch 460 may also include interfaces to other devices.

A primary graphics processor 440 within graphics adapter 464 outputs image data, including anti-aliased images to a display 470. Display 470 may include one or more display devices, such as a cathode ray tube (CRT), flat panel display, or the like. Primary graphics processor 440 within graphics adapter 464 is also coupled to a primary frame buffer 445, which may be used to store graphics data, image data, and program instructions. A graphics processor 450 within graphics adapter 465 is coupled to a frame buffer 455, which may also be used to store graphics data, image data, and program instructions. In the preferred embodiment of the present invention, primary graphics processor 440 and graphics processor 450 are each a graphics processor 250.

Graphics driver 405 may configure graphics processor 450 and primary graphics processor 440 such that the graphics processing workload performed by system 400 is divided between graphics processor 450 and primary graphics processor 440 to produce the image data. For example, when "split frame rendering" is used, a portion of each frame is processed by primary graphics processor 440 and the remaining portion of the image is produced by graphics processor 450. Graphics driver 405 may configure graphics processor 450 to process a larger or smaller portion of each image than primary graphics processor 440. When "alternate frame rendering" is used, graphics driver 405 configures primary graphics processor 440 to produce even frames and graphics processor 450 is configured to produce odd frames. Primary graphics processor 440 may receive image data for the odd frames from graphics processor 450 via switch 460 or via connection 467. In other embodiments of the present invention, host processor 420 controls the transfer of the image data from graphics processor 450 to primary graphics processor 440.

Finally, when "anti-alias rendering" is used, graphics driver 405 configures primary graphics processor 440 to render each frame using a first pixel offset and a first sub-pixel sample position pattern to produce first image data. Graphics driver 405 configures graphics processor 450 to render each frame using a complementary pixel offset and a complementary sub-pixel sample position pattern to produce second image data. Primary graphics processor 440 receives the first image data and combines the first image data with the second image data to produce anti-aliased image data for each frame.

Although computing system 400 as shown is a graphics processing system, alternate embodiments of computing system 400 may process other types of data, such as audio data, multi-media data, or the like. In those alternate embodiments, graphics processor 450 and primary graphics processor 440 would be replaced with other appropriate data processing devices. Likewise, graphics driver 405 would be replaced with a device driver corresponding to the data processing device.

Figure 5:
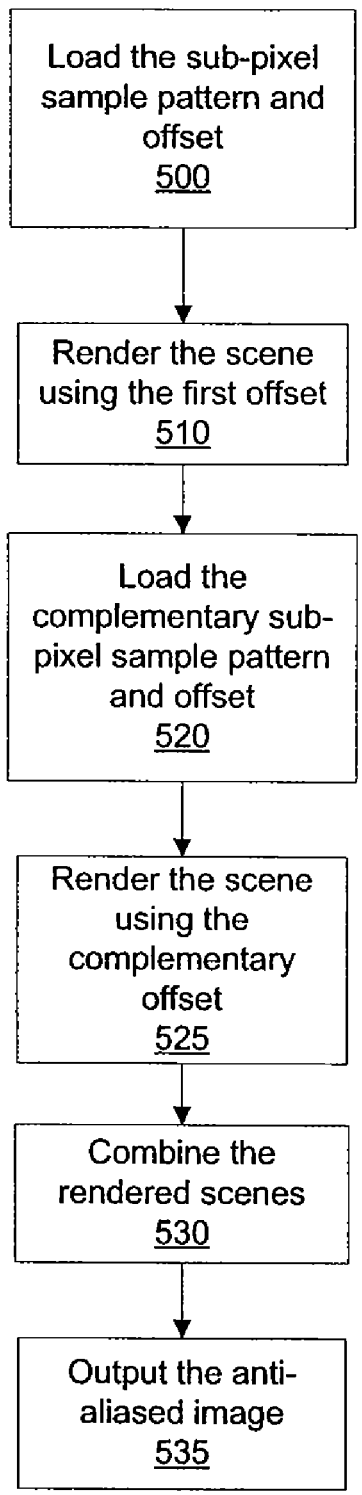
FIG. 5 illustrates a flow diagram of an exemplary method of producing anti-aliased images using the graphics processing system of FIG. 3A in accordance with one or more aspects of the present invention.

FIG. 5 illustrates a flow diagram of an exemplary method of producing anti-aliased images using graphics subsystem 370 of FIG. 3A, in accordance with one or more aspects of the present invention. In step 500 graphics device driver 320 loads sample position table 385 with a first sub-pixel sample pattern and loads pixel offset table 367 with a first offset. In step 510 graphics processor 250 renders the scene using the first offset and first sub-pixel sample pattern to produce first image data. In step 520 graphics device driver 320 loads sample position table 385 with a complementary sub-pixel sample pattern and loads pixel offset table 367 with a complementary offset.

In step 510 graphics processor 250 renders the scene using the complementary offset and complementary sub-pixel sample pattern to produce second image data. The first image data and second image data may be stored in frame buffer 330 or texture memory 325. In step 530 graphics processor 250 combines the first image data with the second image data to produce an anti-aliased image. The anti-aliased image data is stored in frame buffer 330 for output to display device 335 or system interface 315 (for storage).

Figure 6:
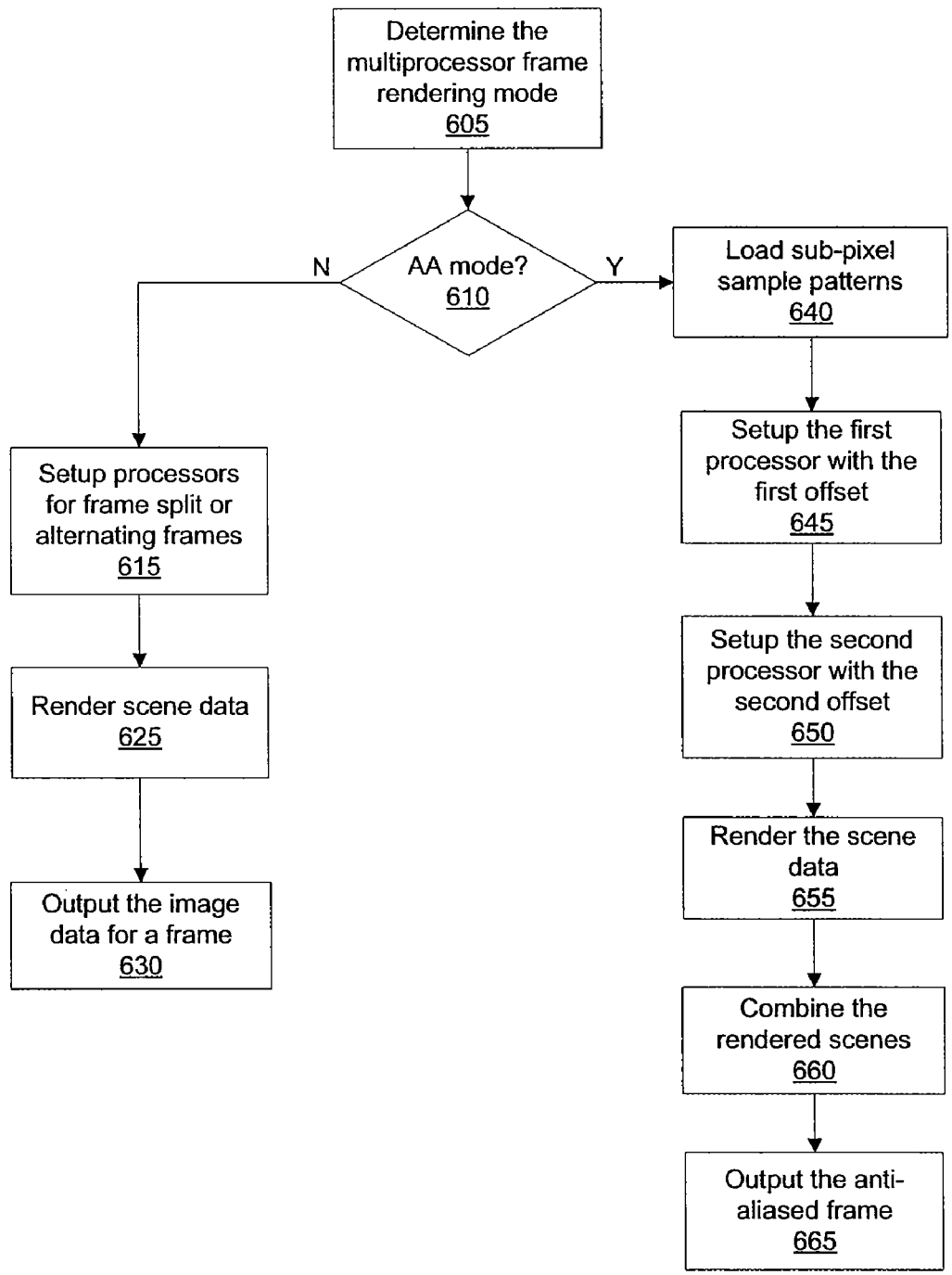
FIG. 6 illustrates a flow diagram of an exemplary method of producing anti-aliased images using the graphics processing system of FIG. 4 in accordance with one or more aspects of the present invention.

FIG. 6 illustrates a flow diagram of an exemplary method of producing anti-aliased images using the graphics subsystem 480 of FIG. 4, in accordance with one or more aspects of the present invention. In step 605 graphics driver 405 determines the multiprocessor frame rendering mode, e.g., split, alternating, or anti-aliased. In step 610 graphics driver 405 determines if the multiprocessor frame rendering mode is anti-aliased, and, if not, then in step 615 graphics driver 405 sets up graphics processor 450 and primary graphics processor 440 for rendering using the specified frame rendering mode (split or alternating), as previously described. In step 625 graphics subsystem 480 renders scene data to produce image data for the frame. In step 630 graphics subsystem 480 outputs the image data for the frame.

If, in step 610 graphics driver 405 determines that the multiprocessor frame rendering mode is anti-aliased, then in step 640 graphics driver 405 loads sample position table 385 in primary graphics processor 440 with sub-pixel sample pattern and loads sample position table 385 in graphics processor 450 with the complementary sub-pixel sample pattern. In step 645 graphics driver 405 loads pixel offset table 367 in primary graphics processor 440 with a first offset. In step 650 graphics driver 405 loads pixel offset table 367 in graphics processor 450 with a complementary offset.

In step 655 graphics subsystem 480 renders a scene and produces image data for the first offset and the complementary offset. In step 660 primary graphics processor 440 combines the rendered image data corresponding to the first offset and the complementary offset to produce anti-aliased image data for a frame. In step 665 primary graphics processor 440 outputs the anti-aliased image data for the frame.

Two or more unique sub-pixel sample patterns that are complementary are specified by a sub-pixel sample pattern set. Each sample pattern within a set provides a good sub-pixel distribution, so that when only a single pattern of the set is used to produce an anti-aliased image, the image quality is improved compared with an image produced using a single sub-pixel sample position. In addition to providing sub-pixel coverage information, the sub-pixel sample pattern sets may be used to produce sub-pixel shading information. Furthermore, the sub-pixel sample pattern sets may be used in single processor systems or in multiprocessor systems to produce anti-aliased images. In multiprocessor systems each processor renders the scene using a different viewport offset and sub-pixel sample pattern to produce image data for an anti-aliased frame.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of producing anti-aliased image data, comprising:
   loading a first sub-pixel sample pattern for use during rendering;
   rendering scene data using first pixel offset and the first sub-pixel sample pattern to produce first image data;
   loading a second sub-pixel sample pattern that is complementary to the first sub-pixel sample pattern;
   rendering the scene data using a second pixel offset and the second sub-pixel sample pattern to produce second image data; and
   combining the first image data and the second image data to produce an anti-aliased image of the scene data,
   wherein the first sub-pixel sample pattern is loaded into a first graphics processor, the second sub-pixel sample pattern is loaded into a second graphics processor, and the first graphics processor is configured to combine the first image data and the second image data.

2. The method of claim 1, wherein the rendering of the scene data using the first pixel offset and the rendering of the scene data using the second pixel offset comprises:
   rasterizing the scene data to produce sub-pixel coverage information;
   computing sub-pixel shading information; and
   processing the sub-pixel coverage information and sub-pixel shading information to produce the first image data and the second image data.

3. The method of claim 1, further comprising the steps of:
   loading the first pixel offset into the first graphics processor; and
   loading the second pixel offset into the second graphics processor.

4. The method of claim 1, further comprising the step of determining that an anti-alias rendering mode is specified.

5. The method of claim 1, further comprising the step of displaying the anti-aliased image.

6. The method of claim 1, wherein a sub-pixel sample position of the first and second sub-pixel sample patterns lies outside of a pixel boundary in the anti-aliased image that the sub-pixel sample position contributes to.

7. The method of claim 1, wherein the first sub-pixel sample pattern and the second sub-pixel sample pattern each include eight sub-pixel sample positions.

8. The method of claim 1, wherein the step of rendering of the scene data using the first pixel offset and the rendering of the scene data using the second pixel offset comprises combining data for each sub-pixel sample position based on a sub-pixel coverage mask for each pixel to produce one color for each pixel of the first image data and the second image data.

9. The method of claim 1, further comprising the steps of:
   loading a third sub-pixel sample pattern that is complementary to the first sub-pixel sample pattern and the second sub-pixel sample pattern;
   rendering the scene data using a third pixel offset and the third sub-pixel sample pattern to produce third image data; and
   combining the third image data with the first image data and the second image data to produce the anti-aliased image of the scene data.

10. A system for producing anti-aliased image data including a primary graphics processor, comprising:
    a geometry processing unit configured to store pixel offsets for use during viewport transform operations to produce offset vertices defining graphics primitives of scene data;
    a sample position table configured to store sub-pixel sample patterns for complementary sample pattern sets;
    a rasterization unit coupled to the sample position table and configured to produce sub-pixel coverage information for the graphics primitives using a first sub-pixel sample pattern of a complementary sample pattern set; and
    a fragment shader coupled to the rasterization unit and configured to:
    shade fragments of graphics primitives using the first sub-pixel sample pattern of the complementary sample pattern set to produce first image data corresponding to a first pixel offset and the first sub-pixel sample pattern of the complementary sample pattern set; and
    combine the first image data and second image data corresponding to a second pixel offset and the other sub-pixel sample pattern of the complementary sample pattern set to produce an anti-aliased image of the scene data.

11. The system of claim 10, wherein the rasterization unit is further configured to produce sub-pixel coverage information for the graphics primitives using a second sub-pixel sample pattern of a complementary sample pattern set and the fragment shader is further configured to shade fragments of graphics primitives using the second sub-pixel sample pattern of the complementary sample pattern set to produce the second image data corresponding to a second pixel offset and the second sub-pixel sample pattern of the complementary sample pattern set.

12. The system of claim 10, wherein the system includes a second graphics processor comprising:
    a geometry processing unit configured to store pixel offsets for use during viewport transform operations to produce offset vertices defining graphics primitives of scene data;
    a sample position table configured to store sub-pixel sample patterns for complementary sample pattern sets;
    a rasterization unit coupled to the sample position table and configured to produce sub-pixel coverage information for the graphics primitives using the second sub-pixel sample pattern of the complementary sample pattern set; and a fragment shader coupled to the rasterization unit and configured to shade fragments of graphics primitives using the second sub-pixel sample pattern of the complementary sample pattern set to produce the second image data corresponding to the second pixel offset and the second sub-pixel sample pattern of the complementary sample pattern set.

13. The system of claim 10, further comprising a display device that is coupled to the primary graphics processor and configured to display the anti-aliased image.

14. The system of claim 10, further comprising a graphics device driver configured to load the pixel offsets into the geometry processing unit and load the sub-pixel sample patterns for complementary sample pattern sets into the sample position table when an anti-alias rendering mode is specified.

15. The system of claim 10, wherein a sub-pixel sample position of the complementary sample pattern set lies outside of a pixel boundary in the anti-aliased image that the sub-pixel sample position contributes to.

16. The system of claim 10, wherein the first image data and second image data are stored as texture maps.

17. The system of claim 10, wherein the first sub-pixel sample pattern and the second sub-pixel sample pattern each include eight sub-pixel sample positions.

18. The system of claim 10, wherein the fragment shader is further configured to determine a color for each sub-pixel sample position in the first sub-pixel sample pattern of the complementary sample pattern set to produce the first image data.

19. The system of claim 10, wherein the complementary sample pattern set includes a third sub-pixel sample pattern.

* * * * *